United States Patent
Sokabe et al.

(10) Patent No.: US 11,446,820 B2
(45) Date of Patent: Sep. 20, 2022

(54) ROBOT PATH GENERATING DEVICE AND ROBOT SYSTEM

(71) Applicant: Kabushiki Kaisha Yaskawa Denki, Kitakyushu (JP)

(72) Inventors: Koji Sokabe, Kitakyushu (JP); Masaru Adachi, Kitakyushu (JP)

(73) Assignee: KABUSHIKI KAISHA YASKA WA DENKI, Fukuoka (JP)

( * ) Notice: Subject to any disclaimer, the term of this patent is extended or adjusted under 35 U.S.C. 154(b) by 228 days.

(21) Appl. No.: 16/452,529

(22) Filed: Jun. 26, 2019

(65) Prior Publication Data

US 2019/0314989 A1 Oct. 17, 2019

Related U.S. Application Data

(63) Continuation of application No. PCT/JP2018/001917, filed on Jan. 23, 2018.

(30) Foreign Application Priority Data

Jan. 31, 2017 (JP) .............................. JP2017-015408

(51) Int. Cl.
 B25J 9/16 (2006.01)
(52) U.S. Cl.
 CPC .............. *B25J 9/1664* (2013.01); *B25J 9/163* (2013.01)
(58) Field of Classification Search
 CPC combination set(s) only.
 See application file for complete search history.

(56) References Cited

U.S. PATENT DOCUMENTS

| 6,246,931 B1 | 6/2001 | Shinogi | |
| 10,035,266 B1* | 7/2018 | Kroeger | B25J 9/1664 |
| 2011/0035087 A1* | 2/2011 | Kim | B25J 9/1666 |
| | | | 701/25 |

(Continued)

FOREIGN PATENT DOCUMENTS

| JP | H05119823 A | 5/1993 |
| JP | 2000010617 A | 1/2000 |

(Continued)

OTHER PUBLICATIONS

Oktay Arslan, Machine Learning Guided Exploration for Sampling-based Motion Planning Algorithms, Sep. 28-Oct. 2, 2015, 2015 IEEE/RSJ International Conference on Intelligent Robots and Systems (IROS) (Year: 2015).*

(Continued)

*Primary Examiner* — Jeff A Burke
*Assistant Examiner* — Arslan Azhar
(74) *Attorney, Agent, or Firm* — HEA Law PLLC

(57) ABSTRACT

To generate a more appropriate path, provided is a robot path generation device including circuitry configured to: hold a track planning module learning data set, in which a plurality of pieces of path data generated based on a motion constraint condition of a robot, and evaluation value data, which corresponds to each of the plurality of pieces path data and is a measure under a predetermined evaluation criterion, are associated with each other; and generate, based on a result of a machine learning process that is based on the track planning module learning data set, a path of the robot between a set start point and a set end point, which are freely set.

11 Claims, 13 Drawing Sheets

(56) References Cited

U.S. PATENT DOCUMENTS

| | | | |
|---|---|---|---|
| 2011/0106306 A1* | 5/2011 | Kim | B25J 9/1664 700/246 |
| 2011/0106308 A1* | 5/2011 | Eliasson | B25J 9/1664 700/250 |
| 2011/0172818 A1 | 7/2011 | Kim et al. | |
| 2013/0238240 A1* | 9/2013 | Tamai | G01C 21/3446 701/527 |
| 2014/0148949 A1 | 5/2014 | Graca et al. | |
| 2014/0257558 A1* | 9/2014 | Frische | B25J 9/1664 700/245 |
| 2015/0100194 A1* | 4/2015 | Terada | G05D 1/0214 701/25 |
| 2015/0278404 A1* | 10/2015 | Embon | G06F 30/20 703/13 |
| 2017/0088360 A1* | 3/2017 | Brazeau | B25J 9/1664 |
| 2017/0157769 A1* | 6/2017 | Aghamohammadi | G01C 21/32 |
| 2017/0348856 A1 | 12/2017 | Nakaya et al. | |

FOREIGN PATENT DOCUMENTS

| | | |
|---|---|---|
| JP | 2002073130 A | 3/2002 |
| JP | 2008105132 A | 5/2008 |
| JP | 2011161624 A | 8/2011 |
| JP | 2013193194 A | 9/2013 |
| JP | 2014104581 A | 6/2014 |
| WO | WO2016/103297 A1 | 6/2016 |

OTHER PUBLICATIONS

English translation of the Written Opinion of the International Searching Authority (PCT/ISA/237) for PCT/JP2018/001917 with PCT/IB/338 and PCT/IB/373 dated Aug. 15, 2019.

Office Action of Jan. 10, 2020, for corresponding JP Patent Application No. 2018-566072 and partial translation of the Office Action.

Sertac Karaman et al. "Incremental Sampling-based Algorithms for Optimal Motion Planning", ARXIV. ORG, Cornell University, NY14853, May 4, 2010, XP080476284, DOI:10.15607/RSS.2010. VI.034, p. 1-20.

Search Report dated Jul. 28, 2020, for corresponding EP Patent Application No. 18748623.8.

Palmieri Luigi et al: "Distance metric learning for RRT-based motion planning with constant-time inference", 2015 IEEE International Conference on Robotics and Automation (ICRA), IEEE, May 26, 2015 (May 26, 2015), pp. 637-643, XP033168476, DOI:10. 1109/ICRA.2015.7139246 [retrieved on Jun. 29, 2015].

Office Action dated Dec. 8, 2021, for corresponding EP Patent Application No. 18748623.8 pp. 1-10.

Office Action dated Nov. 8, 2021, for corresponding CN Patent Application No. 201880008226.2 with English translation pp. 1-16.

\* cited by examiner

ROBOT PATH GENERATING DEVICE AND ROBOT SYSTEM

CROSS-REFERENCE TO RELATED APPLICATION

The present disclosure contains subject matter related to that disclosed in Japanese Patent Application JP2017-015408 filed in the Japan Patent Office on Jan. 31, 2017 and International Patent Application PCT/JP2018/001917 filed in the Japan Patent Office on Jan. 23, 2018 the entire contents of which are hereby incorporated by reference.

BACKGROUND OF THE INVENTION

Field of the Invention

The embodiments disclosed herein relates to a robot path generation device and a robot system.

Description of the Related Art

In JP2014-104581A1, there is described a method of generating a taught path and a calibrating path of a robot through a simulation by a controller.

SUMMARY OF THE INVENTION

According to one embodiment of the present invention, there is employed a robot path generation device including circuitry configured to: hold a data set, in which a plurality of pieces of path data generated based on a motion constraint condition of a robot, and evaluation value data, which corresponds to each of the plurality of pieces path data and is a measure under a predetermined evaluation criterion, are associated with each other; and a path generation module configured to generate, based on a result of a machine learning process that is based on the data set, a path of the robot between a set start point and a set end point, which are freely set.

DESCRIPTION OF THE EMBODIMENTS

Now, a first embodiment of the present invention is described with reference to the drawings.

<Schematic Configuration of Robot System>

Figure 1:
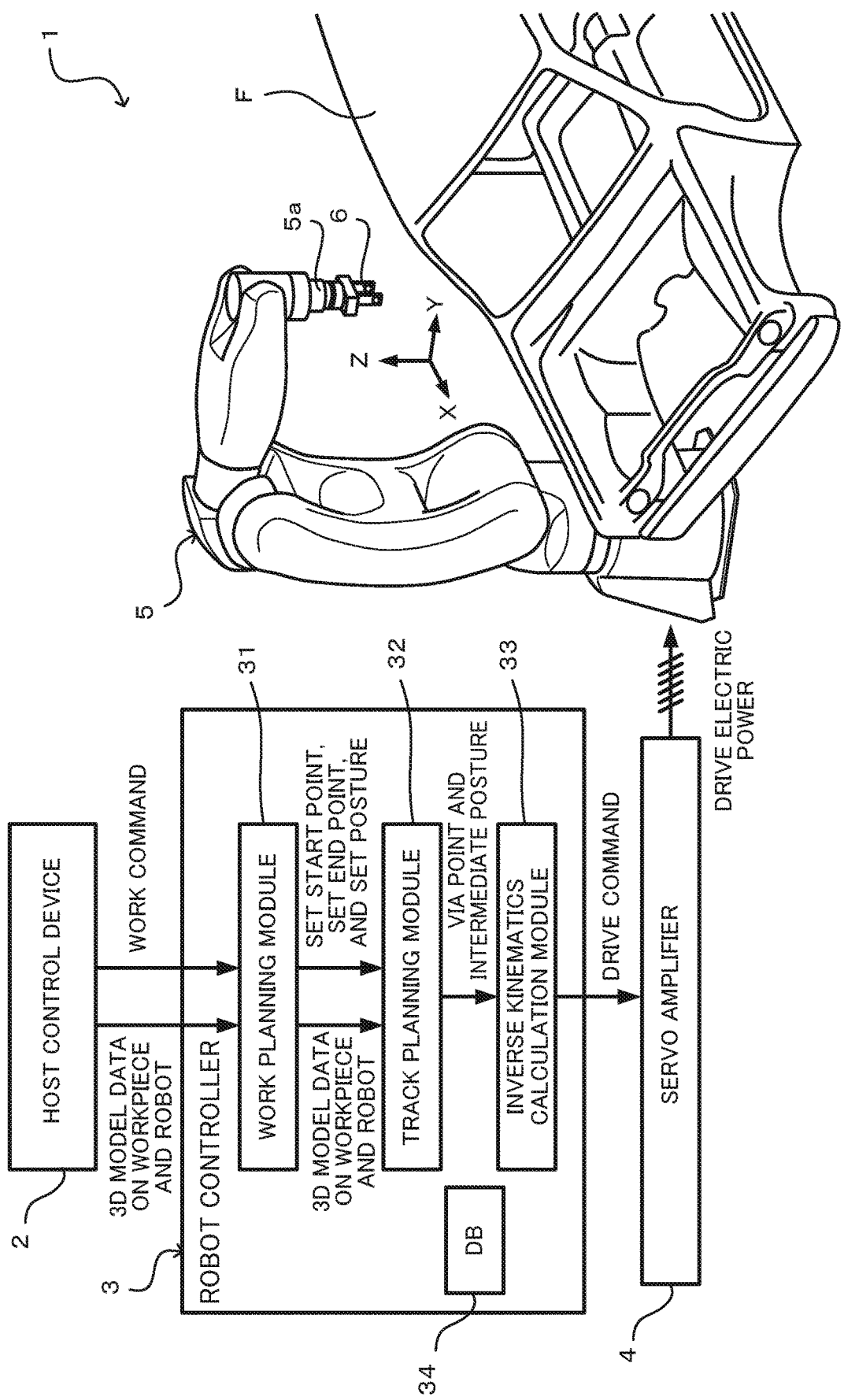
FIG. 1 is a diagram for illustrating an example of a schematic system block configuration of a robot system according to an embodiment of the present invention.

FIG. 1 is an illustration of an example of a schematic system block configuration of a robot system according to the first embodiment. In FIG. 1, a robot system 1 includes a host control device 2, a robot controller 3, a servo amplifier 4, and a robot 5. Although a case in which work is performed on a frame F of an automobile as a target workpiece is described in the example of the first embodiment, another mechanical structure or the like may be set as the target workpiece, and this system may be applied to other work such as embedding of parts, spraying of paint, or an inspection using a camera image.

The host control device 2 (input device) is constructed from, for example, a general-purpose personal computer including a CPU, a ROM, a RAM, an operation unit, a display unit, and others, which are not particularly shown, and controls an overall motion of the robot system 1. Specifically, the host control device 2 inputs to the robot controller 3 a work command based on various settings and commands input from an operator through the operation unit, and 3D model data (for example, CAD data and CAM data) representing various specifications including three-dimensional structures of the target workpiece (frame F in this example) and the robot 5.

The robot controller 3 performs, based on the 3D model data input from the host control device 2, various types of processing for implementing the work command also input from the host control device 2, and outputs a drive command to the servo amplifier 4. The robot controller 3 includes a work planning module 31, a track planning module 32, and an inverse kinematics calculation module 33.

The work planning module 31 plans, based on the 3D model data and the work command input from the host control device 2, specific details of work to be performed by the robot 5 (for example, a process of moving a position of motion of an end effector 6 described later, and details of motion at each position), and outputs a set start point, a set end point, and a set posture that are generated by the planning to the track planning module 32. The set start point, the set end point, and the set posture are commands representing a start point, an end point, and a posture of the end effector 6 at the end point, respectively, at the time when a reference point of the end effector 6 is moved in a work space coordinate system XYZ of the robot 5. Meanwhile, the work planning module 31 inputs to the track planning module 32 the same 3D model data as that input from the host control device 2. The work planning module 31 also outputs a motion command directed to the end effector 6, but this is not shown in FIG. 1.

The track planning module 32 outputs, to the inverse kinematics calculation module 33, based on the set start point, the set end point, the set posture, and the 3D model data input from the work planning module 31, an appropriate via point and intermediate posture for moving the end effector 6 from the set start point to the set end point such that the robot 5 does not interfere with or come into contact with the target workpiece and for controlling the posture of the robot 5 such that the robot 5 has the set posture. This internal processing of the track planning module 32 in the example of the first embodiment is performed through use of a neural network learned by a machine learning process, and processing details and a method thereof are described later in detail. The track planning module 32 corresponds to a path generation module in each of the claims.

The inverse kinematics calculation module 33 calculates target rotation angles of respective drive axis motors (not shown) of the robot 5 that are required for achieving movement from the position and the posture of the end effector 6 at the current time to the via point and the intermediate posture input from the track planning module 32 and for achieving the posture control, and outputs a drive command corresponding to the target rotation angles.

The above-mentioned processing and the like of the work planning module 31, the track planning module 32, and the inverse kinematics calculation module 33 are not limited to such exemplary shares of processing, and, for example, may be performed by a smaller number of processing modules (for example, a single processing module), or may be performed by processing modules obtained by further dividing the above-mentioned processing modules. Further, the robot controller 3 may be implemented as software by a program executed by a CPU 901 (see FIG. 12) described later, or apart or all of the robot controller 3 may be implemented as hardware by actual devices such as an ASIC, an FPGA, and other electric circuits (for example, a neuromorphic chip).

The servo amplifier 4 controls, based on the drive command input from the inverse kinematics calculation module 33 of the robot controller 3, feeding of drive electric power for controlling drive of the respective drive axis motors (not shown) of the robot 5 and the end effector 6.

The robot 5 is a manipulator arm (six-axis robot) having six joint axes in the illustrated example of the first embodiment. An arm tip portion 5a of the robot 5 has the end effector 6 in this example mounted thereto, and the position and posture of the end effector 6 in the work space coordinate system XYZ set with respect to the robot 5 can be controlled.

The host control device 2 and the robot controller 3 correspond to a robot path generation device in each of the claims.

<Features of First Embodiment>

In general, a robot is operated by having its respective joints driven by drive motors having about three or more axes. To cause the robot 5 to perform predetermined motion of work on a target workpiece, on which the work is to be performed, the robot controller 3 specifies a path (i.e., a route or a track: sequence of via points) along which a movement reference position, such as the end effector 6 or the arm tip portion 5a, passes from the start point to the end point, for the motion. It is desired that the path be set under a motion constraint condition that, for example, the robot and the target workpiece do not interfere with or come into contact with each other, and hitherto, a path of a robot has been generated by teaching through a manual operation, or by path planning using random sampling.

In normal cases, there are a plurality of paths as a path connecting the same start point and the same end point, but it is desired to set a path that is as appropriate as possible in terms of an evaluation criterion, for example, an electric power consumption. Thus, in the case of the teaching, the operator artificially designs a path for which the evaluation criterion becomes empirically appropriate (path having a relatively low electric power consumption). In the case of the path planning, a path for which the evaluation criterion becomes appropriate (path having a relatively low electric power consumption) is selected from among a large number of paths generated randomly on a simulation. However, the teaching depends greatly on the experience of each operator, and further, the result varies from one operator to another. Moreover, also in the case of the path planning, there is room for improvement in the quality of paths that are randomly generated.

In contrast, the robot controller 3 in the first embodiment includes the track planning module 32 configured to execute a machine learning process based on a track planning module learning data set, to thereby generate a path of the robot between a set start point and a set endpoint that are freely set. In the track planning module learning data set, a plurality of pieces of path data generated based on the motion constraint condition of the robot 5 defined by the 3D model data, and the evaluation value data, which corresponds to each of the pieces of path data and is a measure under a predetermined evaluation criterion, are associated with each other.

In this manner, the track planning module 32 performs machine learning through use of the data set of path data generated based on the motion constraint condition through a simulation or the like, and hence, unlike so-called reinforcement learning, machine learning can be performed through use of a data set in which the robot 5 is guaranteed to avoid interfering with or coming into contact with the work environment including the target workpiece. Further, the data set to be used by the track planning module for machine learning includes the evaluation value data corresponding to each piece of path data, and hence a path that is appropriate in terms of the evaluation criterion can be generated. Now, the above-mentioned method is described in order.

<Path Planning by Via Point Connection in the Case of First Embodiment>

Figure 2:
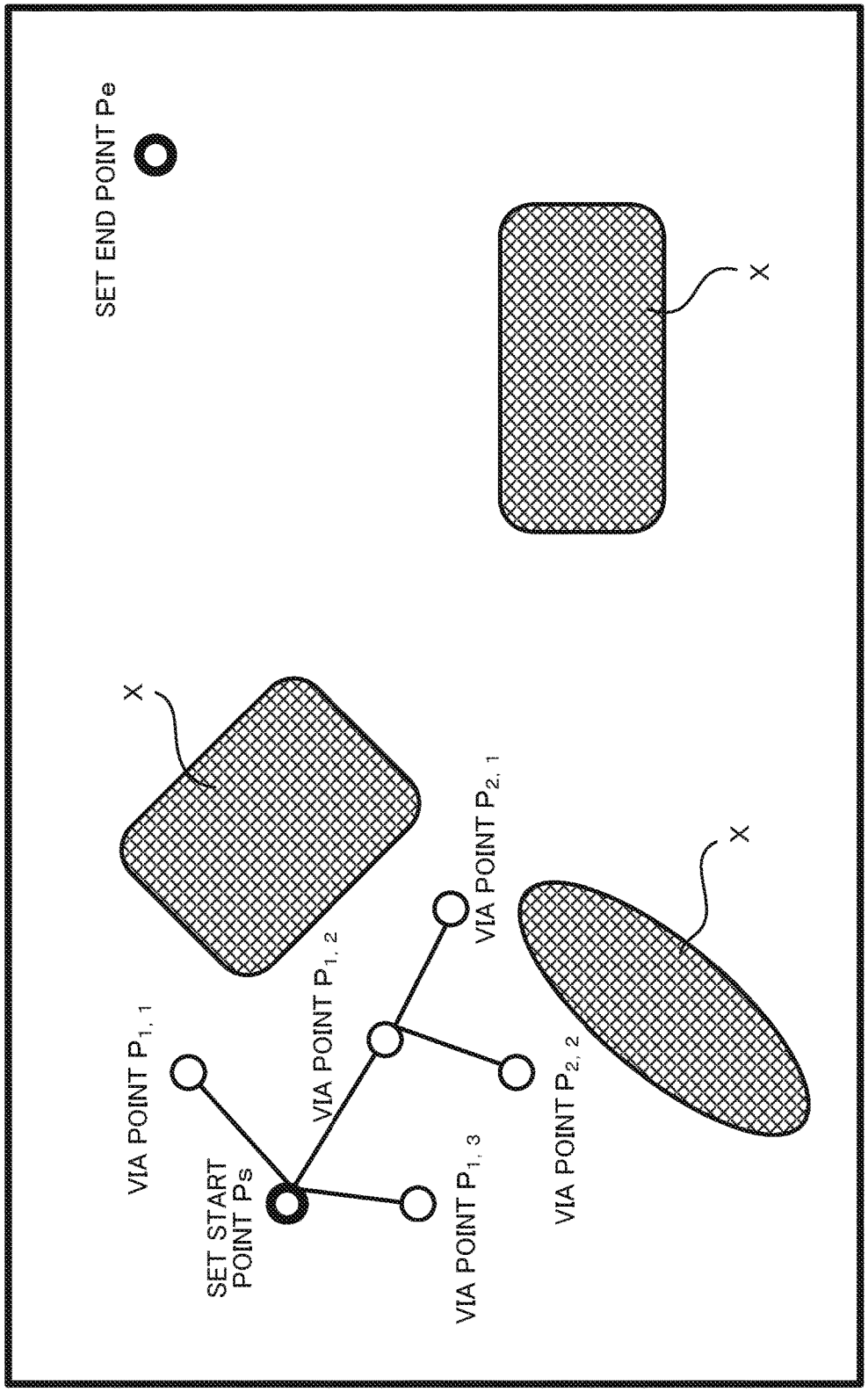
FIG. 2 is a diagram for illustrating a work environment map to illustrate path planning by via point connection in an example of the first embodiment.

FIG. 2 is an illustration of a work environment map to illustrate path planning by via point connection in the example of the first embodiment. The work environment map illustrated here is set by the track planning module 32, and is a plan view in which a six-dimensional drivable space corresponding to the six drive axes of the robot 5 described above is expressed by reducing the dimensions to two dimensions of a vertical direction and a horizontal direction. In general, a three-dimensional position and a three-dimensional posture of the end effector 6 can be controlled by six-axis drive. That is, position coordinates of a single point on the work environment map express state information on both of the three-dimensional position and the three-dimensional posture of the end effector 6. Further, in the work environment map, based on the 3D model data input from the work planning module 31, there are set a plurality of entry-prohibited areas X, in each of which entry of the movement reference position is prohibited because each part of the robot 5 and the frame F of the target workpiece interfere with or come into contact with each other. In FIG. 2, in order to avoid a complicated illustration, the respective entry-prohibited areas X are represented in a simplified manner as three simple geometrical figures.

The track planning module 32 sets, on the work environment map, a set start point Ps and a set end point Pe (each including a posture) input from the work planning module 31, and generates a route along which the movement reference position moves to pass from the set start point Ps to the set endpoint Pe while avoiding entering each of the entry-prohibited areas X, that is, generates a path. In the example of the first embodiment, a large number of via points obtained by branching and searching through a simulation are connected to each other, to thereby generate the above-mentioned path.

As the simulation, specifically, a plurality of via points $P_{1,m}$ (m=1 to 3, that is, three points in the illustrated example), which exist within a predetermined interval from the set start point Ps and do not enter each entry-prohibited area X, are randomly generated first. Then, from each of those via points $P_{1,m}$, a plurality of via points $P_{2,m}$, which exist within the predetermined interval and do not enter each entry-prohibited area X, are randomly generated. Such via points $P_{n,m}$ (m via points through which the movement reference position passes n-th from the set start point) are repeatedly generated until any one of the via points $P_{n,m}$ finally reaches a position within a predetermined interval A from the set end point Pe.

However, when it is found that a generated via point $P_{n,m}$ obviously faces in a direction that is further separated from the set endpoint Pe, or when it is found that an evaluation value described later that corresponds to a route toward the via point $P_{n,m}$ is obviously low, generation of a new via point $P_{n+1,m}$ from the via point $P_{n,m}$ is temporarily interrupted. Further, for example, under a condition that one via point $P_{n,m}$ is sandwiched by a plurality of entry-prohibited areas X, only a single via point $P_{n+1,1}$ may be generated from the via point $P_{n,m}$. Further, when it is found that one via point $P_{n,m}$ cannot reach the set end point Pe by being blocked by the entry-prohibited area X or by a boundary of an area in which work is allowed (edge of the work environment map), generation of a new via point $P_{n+1,1}$ from the via point $P_{n,m}$ is stopped, and branching and searching from another via point $P_{n+1,1}$, which is interrupted as described above, is resumed.

Figure 3:
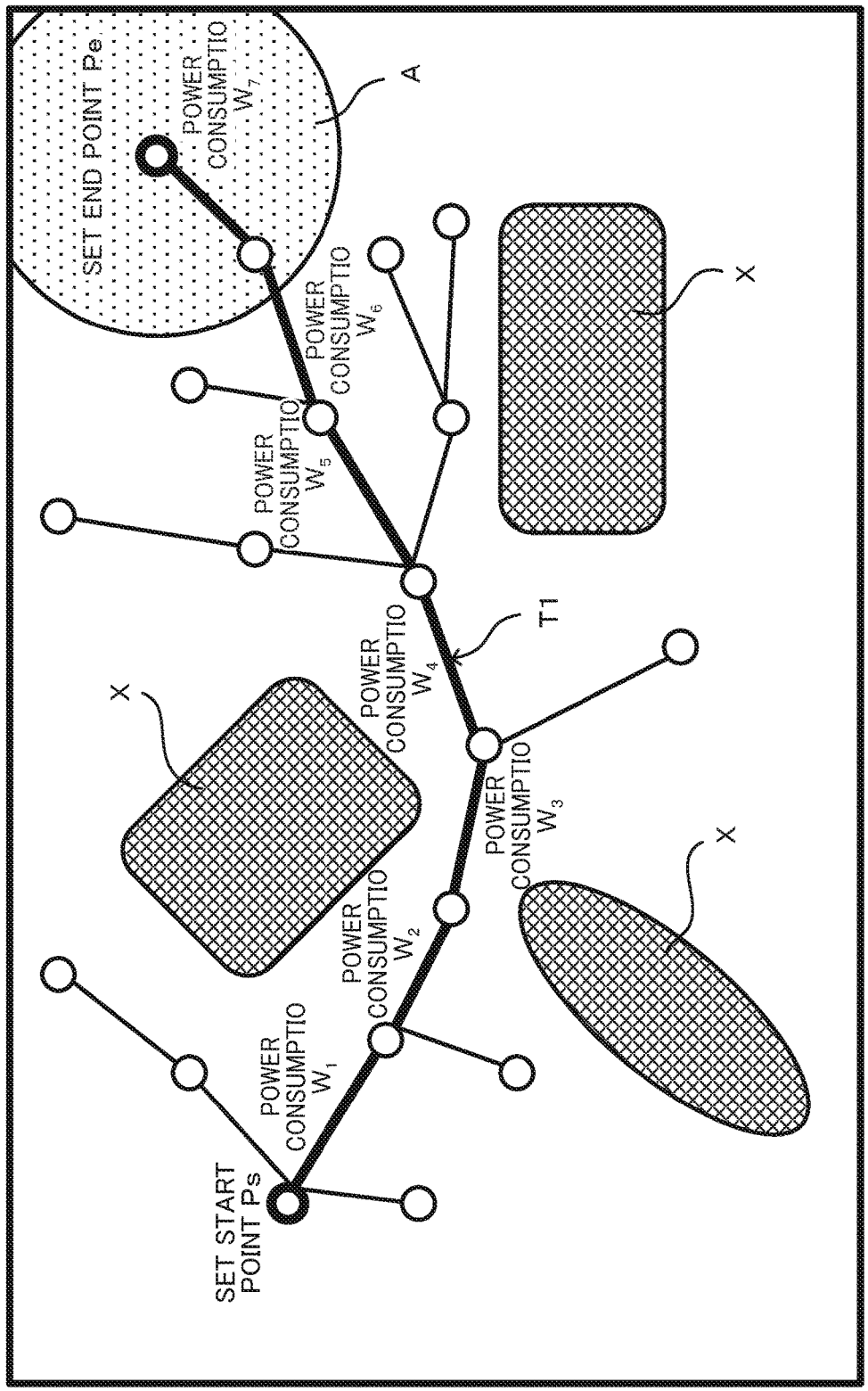
FIG. 3 is a diagram for illustrating a work environment map in which a path is generated by connecting via points.

Then, the via point $P_{n,m}$ that has finally reached the vicinity of the set end point Pe is connected to the set end point Pe, to thereby generate, as illustrated in FIG. 3, a path T1, on which the via points $P_{n,m}$ through which the movement reference position can serially pass from the set start point Ps to the set end point Pe are connected by the sequence of the via points. In this manner, the path T1 of the robot 5 is generated as the sequence of the plurality of via points, and the track planning module 32 outputs, in order, the via points $P_n$ (intermediate postures) from the set start point Ps to the set end point Pe to the inverse kinematics calculation module 33, to thereby be able to control a movement motion of the robot 5 with the track (posture) corresponding to the path T1. Further, every via point $P_n$ on the path T1 is located on an area of motion (motion constraint condition) in which the robot does not enter any entry-prohibited area X (area in which the robot interferes with or comes into contact with a surrounding work environment) on the work environment map. That is, on the track corresponding to the path T1, each part of the robot 5 and the frame F can reliably avoid interfering with or coming into contact with each other.

Further, on the above-mentioned simulation, for each node of the path T1, that is, for each route of movement between two adjacent via points on the path T1, an electric power $W_n$ (n=1 to 7 in the illustrated example) to be consumed by the movement motion of the robot 5 can be calculated. In the example of the first embodiment, the electric power consumption W is used as the evaluation criterion, and a path T1 having as low a total electric power consumption W as possible in the entire path T1 is highly evaluated. However, in the path planning through the simulation described above, basically, the position of each via point $P_{n,m}$ is randomly generated, and hence there is room for improvement in the quality of the path T1 from the viewpoint of the evaluation criterion.

Thus, in the first embodiment, via points $P_{1,m}$ corresponding respectively to a variety of combinations of set start points Ps and set end points Pe (set postures) are generated through the simulation described above, and a large number of learning data sets are created by combining the generated via points with evaluation value data corresponding to each via point, and are stored into a database (data set holding unit) 34. The track planning module 32 performs machine learning through use of such a large number of learning data sets, to thereby be able to continuously generate via points $P_{n,m}$ that are highly evaluated, and be able to generate a path T1 that is highly evaluated by connecting those via points. A storage device serving as the database 34 may be included in the robot controller 3 (abbreviated as "DB" in FIG. 1) as in the first embodiment, or may be provided outside the robot controller 3 by being connected to the track planning module 32 in a manner that allows transmission and reception of information.

<Specific Configuration of Track Planning Module in the Case of First Embodiment>

Figure 4:
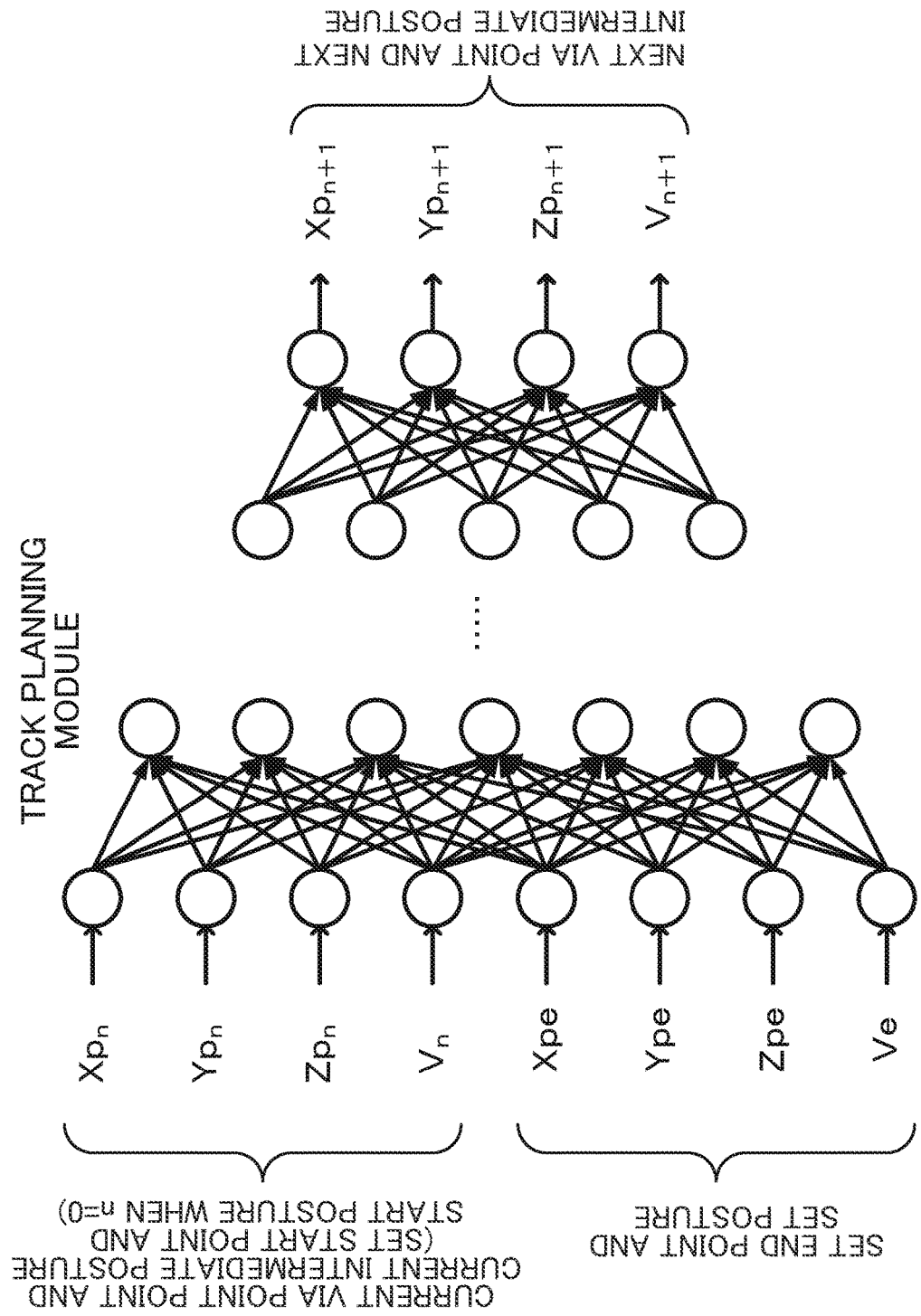
FIG. 4 is a diagram for illustrating an example of a schematic configuration of a neural network model of a track planning module.

Various types of machine learning methods can be applied to the track planning module 32, but in the following, a description is given of an example of a case in which deep learning is applied to a machine learning algorithm, for example. FIG. 4 is an illustration of an example of a schematic model configuration of a neural network of the track planning module 32 in the case where deep learning is applied.

In FIG. 4, the neural network of the track planning module 32 is designed so as to output, for a current via point $P_n$ ($Xp_n$, $Yp_n$, $Zp_n$) and a current intermediate posture $V_n$ (simply described as three-dimensional vector data) located at the current time, and the set end point Pe ($Xpe$, $Ype$, $Zpe$) and the set posture Ve (simply described as three-dimensional vector data) input from the work planning module 31, a next via point $P_{n+1}$ ($Xp_{n+1}$, $Yp_{n+1}$, $Zp_{n+1}$) and a next intermediate posture $V_{n+1}$ (simply described as three-dimensional vector data) through which the movement reference position is estimated to pass next appropriately based on an association relationship among those pieces of input data.

In this case, each value output from each output node of the track planning module 32 is output as multiple values (continuous values) by regression problem solving. Then, the next via point $P_{n+1}$ and the next intermediate posture $V_{n+1}$ formed by those output values are a via point and an intermediate posture that are located within a predetermined interval from the current via point $P_n$ and the current intermediate posture $V_n$ on the work environment map, are not located in any entry-prohibited area X, and are also highly evaluated from the viewpoint of the evaluation criterion (in this example, how low the power consumption by movement is). Next, with the next via point $P_{n+1}$ and the next intermediate posture $V_{n+1}$ being set as the next current via point $P_n$ and the next current intermediate posture $V_n$, and being input again to the track planning module 32 together with the set end point Pe and the set posture Ve, a further next via point $P_{n+1}$ and a further next intermediate posture $V_{n+1}$ can be generated. This processing is repeated until the via point reaches the vicinity of the set end point Pe. When the processing is to be started from the set start point Ps and a start posture Vs, it is only required that the set start point Ps and the start posture Vs be assigned into the current via point $P_n$ and the current intermediate posture $V_n$ (that is, n is set to 0), respectively, for processing.

Figure 5:
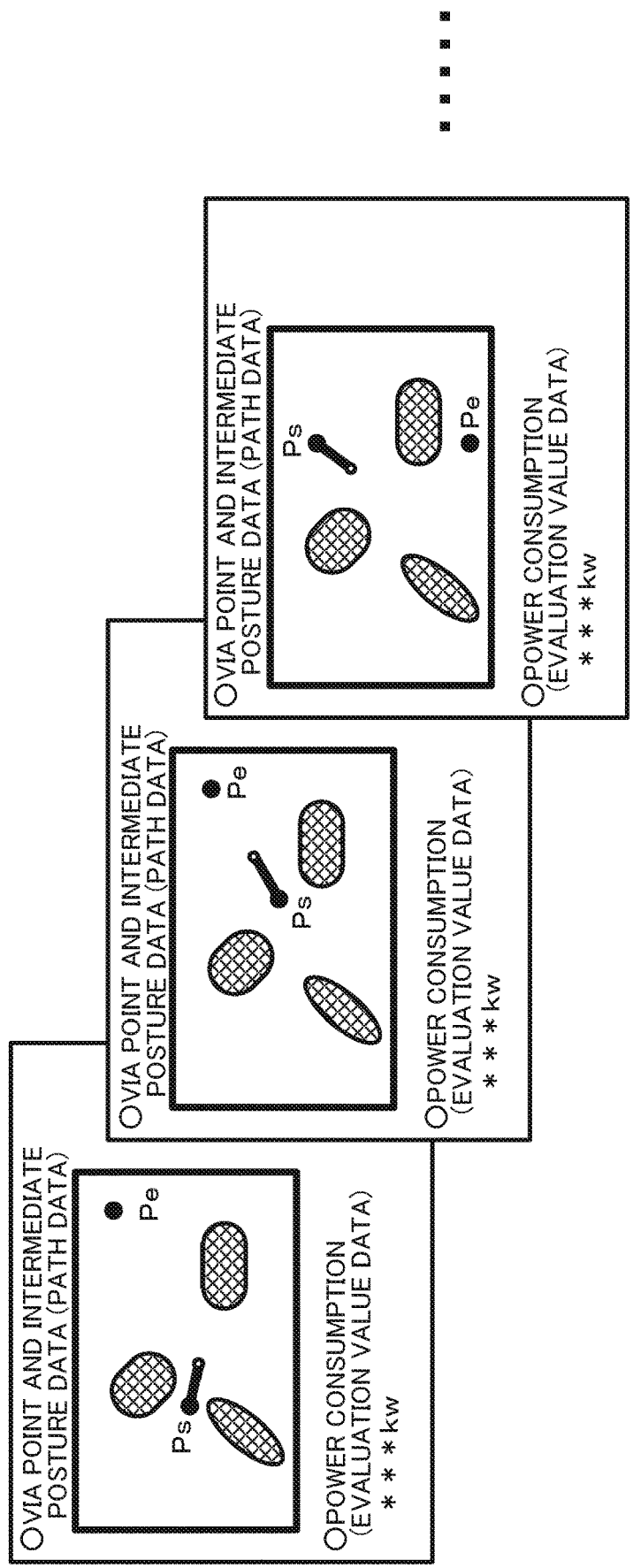
FIG. 5 is a diagram for illustrating an example of a track planning module learning data set containing pieces of path data on via points corresponding to a variety of set start points and a variety of set end points.

The above-mentioned processing of generating the next via point $P_{n+1}$ and the next intermediate posture $V_{n+1}$ by the track planning module 32 is based on content learned through the machine learning process in a learning phase of the track planning module 32. That is, the neural network of the track planning module 32 learns a feature indicating a correlation between each piece of input data and each piece of output data. In the machine learning process of the track planning module 32, a multi-layered neural network designed in the above-mentioned manner is implemented on the robot controller 3 as software (or as hardware), and then the track planning module 32 performs learning by so-called supervised learning through use of a large number of track planning module learning data sets stored in the database 34. As the track planning module learning data set to be used in this case, as illustrated in FIG. 5, for example, path data (illustrated on a work environment map in FIG. 5) representing one via point $P_1$ and one intermediate posture $V_1$, which are generated on a simulation in association with a combination of a predetermined set start point Ps and a predetermined set end point Pe (set posture Ve), and a power consumption by movement (evaluation value data) on the path data are associated with each other to be created as one learning data set. Then, a large number of such learning data sets are created from a variety of combinations of the set start point Ps and the set end point Pe (set posture Ve), and are stored into the database 34.

In the learning phase of the track planning module 32 in the example of the first embodiment, learning is performed by so-called back propagation processing, for example. In the back propagation processing, through use of training data having a combination including the current via point $P_n$ and the current intermediate posture $V_n$ and the set endpoint Pe and the set posture Ve as input data and including the next via point $P_{n+1}$ and the next intermediate posture $V_{n+1}$ as output data, a weight coefficient of each edge connecting nodes is adjusted such that a relationship between an input layer and an output layer of the neural network of the track planning module 32 is established. In the back propagation processing, only a piece of data having a particularly high evaluation value may be extracted from among a large number of data sets, and only the extracted piece of data may be used as the training data to adjust the weight coefficient of each edge to increase the weight coefficient. As another example, all pieces of data sets may be used as the training data, and the weight coefficient of each edge may be adjusted to be increased or decreased in accordance with evaluation value data on each data set. In addition to such back propagation, various known learning methods such as so-called autoencoder, restricted Boltzmann machine, dropout, noise addition, and sparse regularization may also be used in combination to enhance the accuracy of processing.

Further, path data including all of the next via point $P_{n+1}$ and the next intermediate posture $V_{n+1}$ generated by the track planning module 32, the current via point $P_n$ and the current intermediate posture $V_n$, from which those points are generated, and the set end point Pe and the set posture Ve, and evaluation value data on the path data may be associated with each other to create a new learning data set, and the new learning data set may be stored in the database 34 for use in the next learning phase of the track planning module 32. That is, so-called online learning may be executed. This learning phase of the track planning module 32 corresponds to a machine learning process in each of the claims, and a processing portion of the track planning module 32 that forms the neural network described above corresponds to a via point generation module in each of the claims.

As described above, as the machine learning algorithm of the track planning module 32, in addition to the deep learning illustrated herein, another machine learning algorithm (not particularly shown) using, for example, a support-vector machine or a Bayesian network may also be applied. Also in this case, the basic configuration, in which the next via point $P_{n+1}$ and the next intermediate posture $V_{n+1}$ that appropriately correspond to the input set start point Ps and the input set end point Pe are output, is the same.

<Effects of First Embodiment>

As described above, in the robot system 1 according to the first embodiment, the robot controller 3 includes the track planning module 32 configured to execute the machine learning process that is based on the track planning module learning data set, in which the plurality of pieces of path data generated based on the motion constraint condition of the robot 5, and the evaluation value data, which corresponds to each of the pieces of path data and is a measure under a predetermined evaluation criterion, are associated with each other, to thereby generate the path T1 of the robot 5 between the set start point Ps and the set end point Pe that are freely set. In this manner, the track planning module 32 performs machine learning through use of the data set of path data generated based on the motion constraint condition through a simulation or the like, and hence, unlike so-called reinforcement learning, machine learning can be performed through use of a data set in which the robot 5 is guaranteed to avoid interfering with or coming into contact with the work environment. Further, the data set to be used by the track planning module 32 for machine learning includes the evaluation value data corresponding to each piece of path data, and hence a path T1 that is appropriate in terms of the evaluation criterion can be generated. As a result, a more appropriate path T1 can be generated.

Further, in the first embodiment in particular, the track planning module 32 includes a neural network for generating, based on content learned in the machine learning process, a next via point through which the movement reference position is to pass next such that the predetermined evaluation criterion becomes optimal. As a result, the path T1 can be efficiently generated through use of the next via point, which can be generated relatively easily.

Further, in the first embodiment in particular, the track planning module 32 generates the path T1 by starting branching and searching at the next via point generated by the neural network from the set start point Ps, and repeating the branching and searching until the path reaches a vicinity of the set end point Pe. As a result, an appropriate path T1 can be efficiently generated by connecting via points in the sequence of the next via points.

Further, in the first embodiment in particular, the evaluation criterion includes at least the electric power consumption, and thus the path T1 having higher quality can be generated. The evaluation criterion is not limited to the electric power consumption described above, and may also include other evaluation criteria such as a distance of a route of motion, a period of time of motion, a vibration evaluation value, or a load on a specified axis. In this case, for the distance of the route of motion, a path is evaluated more highly as the route of movement of the path, that is, the length of the route on the entire path becomes shorter. Further, for the period of time of motion, a path is evaluated more highly as a period of time of movement of the path becomes shorter, that is, a takt time thereof becomes shorter. Further, for the vibration evaluation value, a path is evaluated more highly as vibration during the movement becomes smaller. Specifically, for the vibration evaluation value, the path may be evaluated based on a so-called jerk value (derivative of acceleration) detected at the arm tip portion $5a$ or the end effector 6. Further, for the load on a specified axis, a path is evaluated more highly as a load on a specified one of joint drive axes of the robot 5 becomes smaller. Those evaluation criteria may be individually applied as in the embodiment described above, or a plurality of evaluation criteria may be applied in combination. When a plurality of evaluation criteria are applied in this case, each of the pieces of evaluation value data may be multiplied as appropriate by a weight coefficient that can be freely set, and total evaluation value data obtained by adding all resultant pieces of data may be recorded in the data set.

Further, in the first embodiment in particular, the motion constraint condition is set to an area of motion of the robot 5 that satisfies an area of motion in which the robot 5 does not interfere with or come into contact with its surrounding work environment (for example, target workpiece, worktable, or tools). As a result, it is possible to generate the path T1 on the presumption that the robot 5 does not interfere with or come into contact with its surrounding work environment. As other motion constraint conditions, there may be set an area of motion in which the robot 5 does not enter a predetermined entry-prohibited area X, which is set, for example, for a safety reason or in order to secure sufficient operation performance of other robots, and an area of motion in which an object (for example, a glass containing water) handled by another handling robot is not inclined by a predetermined angle or more (those areas of motion are not particularly shown). In those cases, it is possible to generate the path T1 on the presumption that the robot is inhibited from entering the entry-prohibited area X, and that the object is inhibited from being inclined by the predetermined angle or more.

Further, in the first embodiment in particular, the host control device 2 is included, which is configured to set the motion constraint condition defined by the 3D model data in the robot controller 3. As a result, the motion constraint condition can be flexibly set in a manner that suits a user's intention. The motion constraint condition may be input to the robot controller 3 by, for example, a programming pendant, instead of the host control device 2.

Further, in the first embodiment in particular, the database 34 stores a new data set, in which the path T1 of the robot 5 generated by the track planning module 32 is associated with the motion constraint condition of the robot 5 and the evaluation value data. As a result, a more appropriate machine learning process can be executed through use of the path data on the path T1 that was generated in the past as an appropriate path, and thus the accuracy of the track planning module 32 can be increased.

<Modification Example of First Embodiment>

The first embodiment described above can be variously modified without departing from the gist and technical idea thereof.

Figure 6:
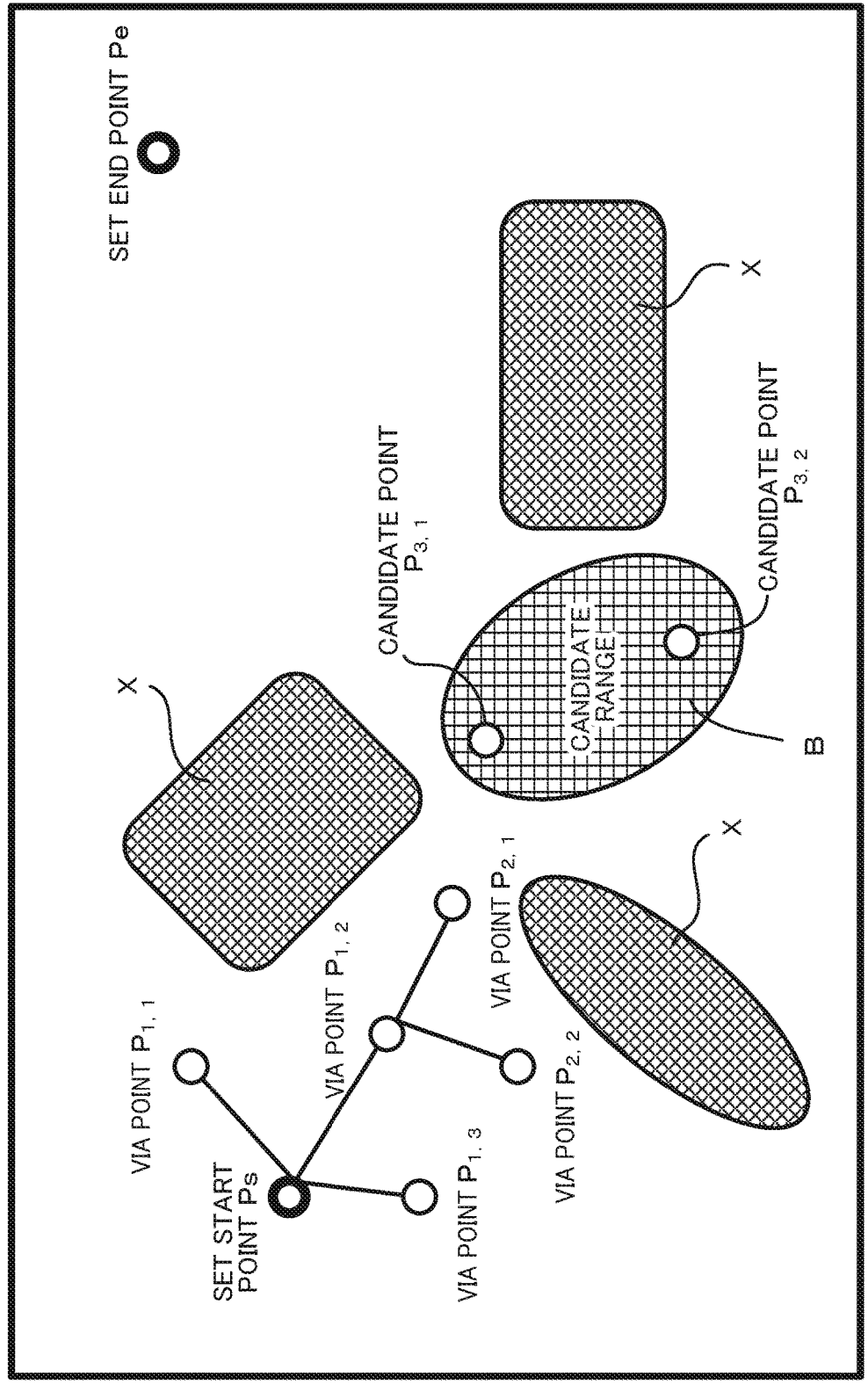
FIG. 6 is a diagram for illustrating a work environment map in a case where a candidate range and a candidate point are searched.

For example, as illustrated in FIG. 6, the track planning module 32 may set a range in which the next via point can be set from a current via point $P_{2,1}$ as a candidate range B, and may generate the next via point from among a plurality of candidate points $P_{3,1}$ and $P_{3,2}$ generated at random positions from within the candidate range B. In this case, as compared with a case in which the next via point is generated at a completely random position from the beginning, the next via point from which a more appropriate path T1 can be expected to be generated toward the set end point Pe can be generated.

Figure 7:
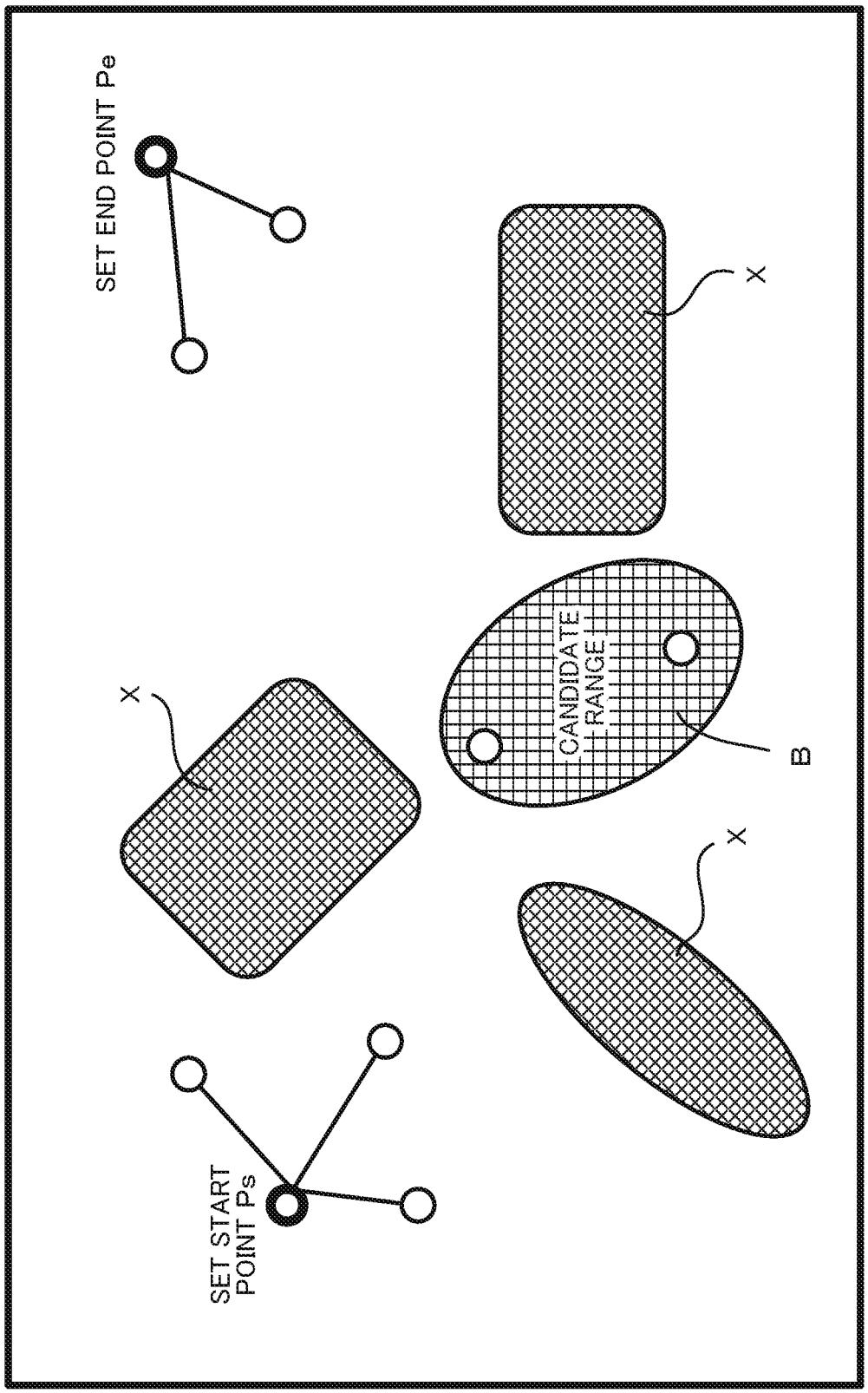
FIG. 7 is a diagram for illustrating a work environment map in a case where SBL or an RRT is used for path planning.

Further, as a basic method for the path planning, single-query, bi-directional, lazy in collision checking (SBL) or a rapidly-exploring random tree (RRT), which are known methods, may be used. In this case, as illustrated in FIG. 7, branching and searching of a via point is performed also from the set end point Pe, and a candidate range (candidate point) generated by the track planning module 32 based on the current via point on each of the set start point Ps side and the set end point Pe side may be used instead for random sampling by the SBL or the RRT.

Second Embodiment

Figure 8:
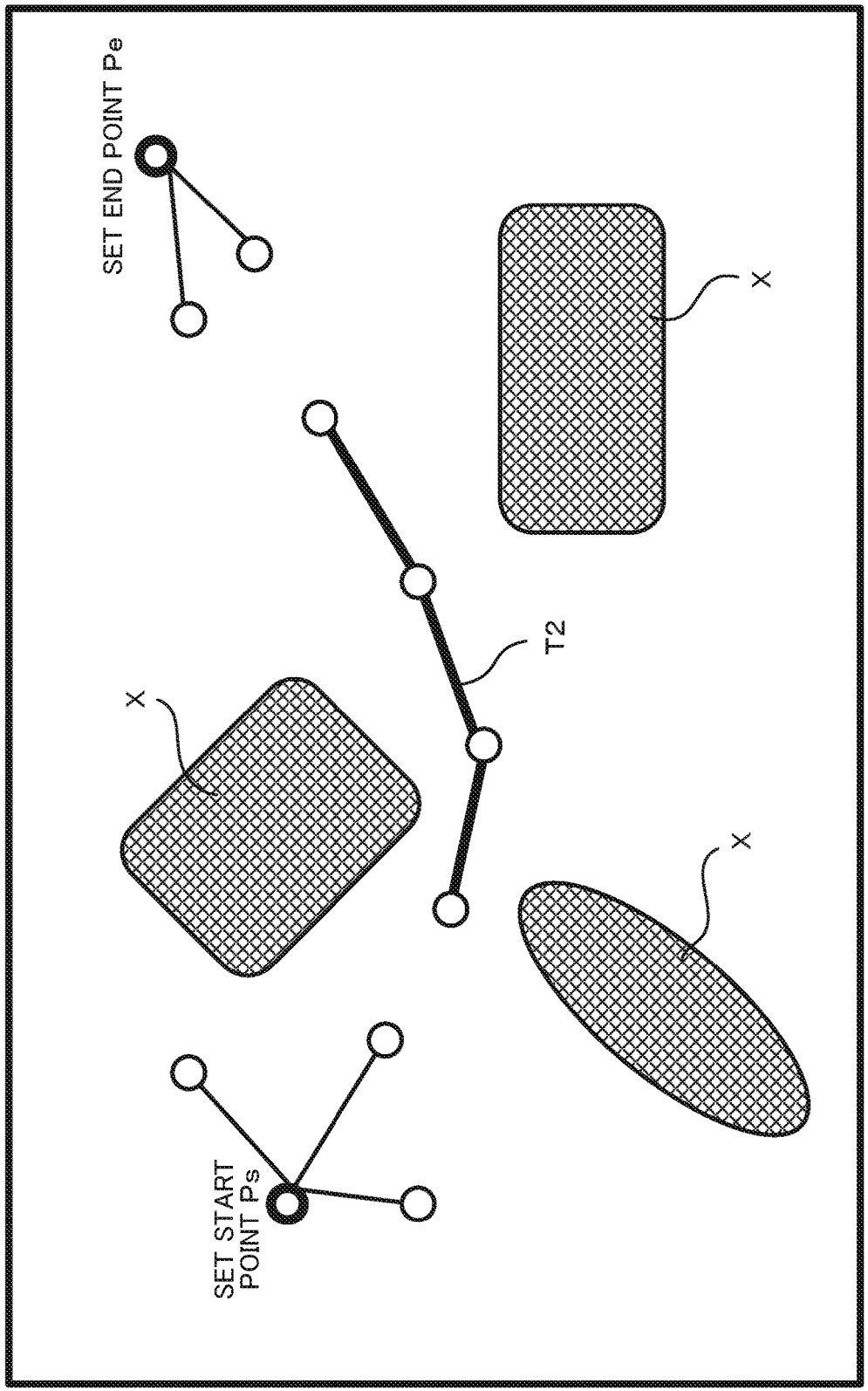
FIG. 8 is a diagram for illustrating a work environment map to illustrate path planning by partial path connection in an example of a second embodiment of the present invention.

Now, a description is given of a second embodiment of the present invention, in which a path is generated through path planning by partial path connection. FIG. 8 is a diagram corresponding to FIG. 2, and is an illustration of a work environment map to illustrate path planning by partial path connection. In the example of the second embodiment, the track planning module 32 connects a partial path generated through a simulation to the set start point Ps and the set end point Pe, to thereby generate a path T1 of the robot 5.

<Path Planning by Via Point Connection in the Case of Second Embodiment>

As the simulation, specifically, branching and searching of an appropriate via point is performed first from each of the set start point Ps and the set end point Pe, and a partial path T2 is randomly generated. The partial path T2 is located to be able to be substantially connected to the set start point Ps and the set end point Pe from those via points on the set start point Ps side and the set end point Pe side within a predetermined interval, and does not enter the entry-prohibited area X. The partial path T2 is formed by connecting via points that are successively arranged at predetermined intervals, and the partial path T2 is repeatedly generated until a partial path T2 that has both ends to which the via points on the set start point Ps side and the set end point Pe side are substantially connectable is generated.

Figure 9:
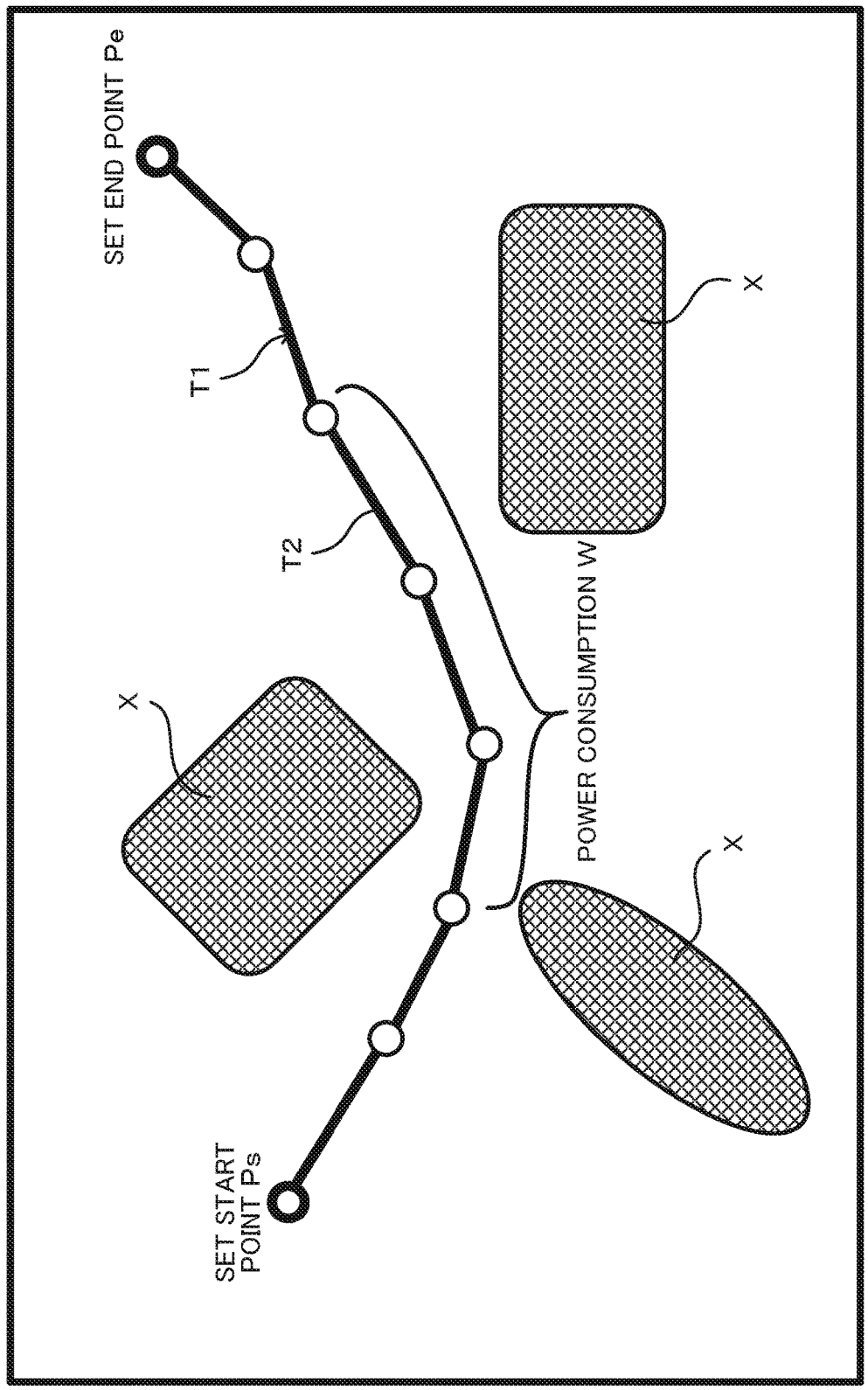
FIG. 9 is a diagram for illustrating a work environment map in which a path is generated by connecting a partial path.

Finally, an appropriate partial path T2 is connected to the via points on the set start point Ps side and the set end point Pe side, to thereby generate, as illustrated in FIG. 9, the path T1, along which the movement reference position can serially pass from the set start point Ps to the set end point Pe. Also on a track corresponding to this path T1, each part of the robot 5 and the frame F can reliably avoid interfering with or coming into contact with each other. The track planning module 32 in the second embodiment corresponds to a partial path generation module in each of the claims.

On the above-mentioned simulation, an electric power W to be consumed by the movement motion of the robot 5 on the partial path T2 can be calculated as evaluation value data, and the evaluation value data can be associated with path data on the set start point Ps, the set end point Pe, and the partial path T2 to create one track planning module learning data set. Then, partial paths T2 corresponding respectively to a variety of combinations of set start points and set end points Pe (set postures) are generated, and a large number of learning data sets are created by combining the generated partial paths with evaluation value data corresponding to each partial path, and are stored into the database (data set holding unit) 34. The track planning module 32 performs machine learning through use of such a large number of learning data sets, to thereby be able to continuously generate partial paths T2 that are highly evaluated, and be able to generate a path T1 that is highly evaluated by connecting those via points.

<Specific Configuration of Track Planning Module in the Case of Second Embodiment>

Figure 10:
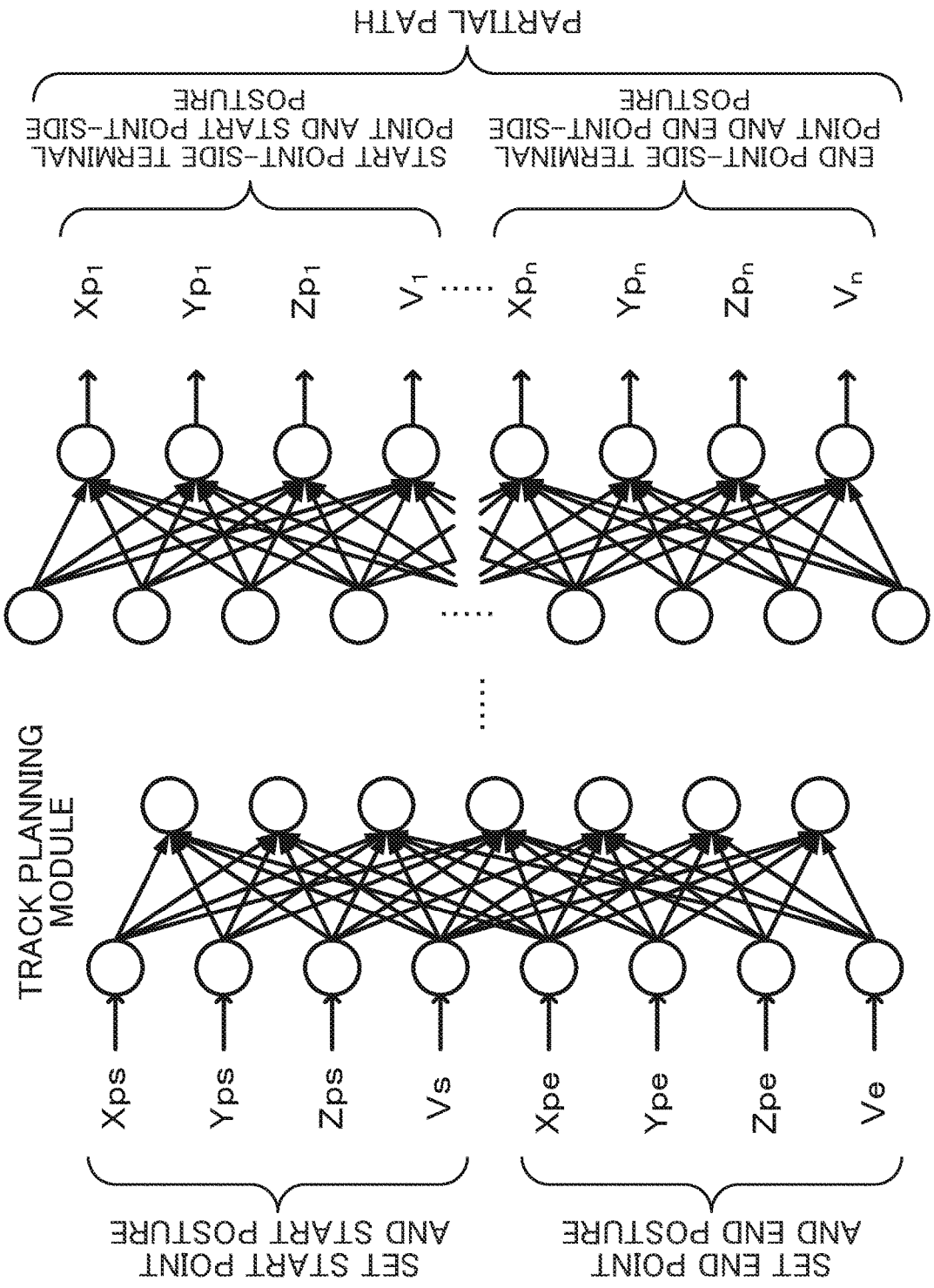
FIG. 10 is a diagram for illustrating an example of a schematic configuration of a neural network model of the track planning module.

Also in the second embodiment, various types of machine learning methods can be applied to the track planning module 32, but in the following, a description is given of an example of a case in which deep learning is applied to a machine learning algorithm, for example. FIG. 10 is an illustration of an example of a schematic model configuration of a neural network of the track planning module 32 in the case where deep learning is applied, which corresponds to FIG. 4 described above.

In FIG. 10, the neural network of the track planning module 32 is designed so as to output, for the set start point Ps (Xps, Yps, Zps) and the start posture Vs (simply described as three-dimensional vector data) and the set end point Pe (Xpe, Ype, Zpe) and the set posture Ve (simply described as three-dimensional vector data) input from the work planning module 31, a start point-side terminal point $P_1$ ($Xp_1$, $Yp_1$, $Zp_1$) and a start point-side posture $V_1$ (simply described as three-dimensional vector data) and each via point for connection (not shown in FIG. 10), and an end point-side terminal point $P_n$ ($Xp_n$, $Yp_n$, $Zp_n$) and an end point-side posture $V_n$ (simply described as three-dimensional vector data) of a partial path T2 that is estimated to be appropriate for connection based on an association relationship among those pieces of input data.

Figure 11:
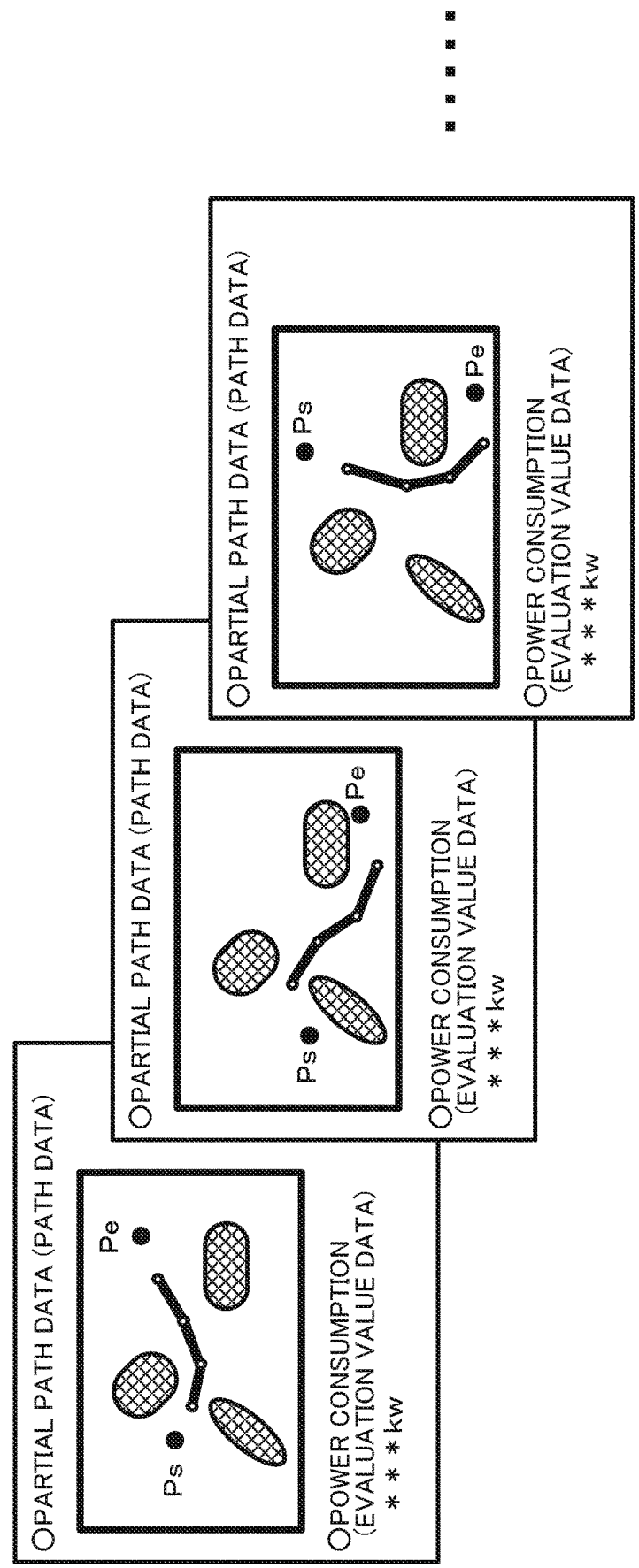
FIG. 11 is a diagram for illustrating an example of a track planning module learning data set containing pieces of path data on partial paths corresponding to a variety of set start points and a variety of set end points.

As the track planning module learning data set to be used in the machine learning process of the track planning module 32, as illustrated in FIG. 11, for example, path data (illustrated on a work environment map in FIG. 11) representing one partial path T2, which is generated on a simulation in association with a combination of a predetermined set start point Ps and a predetermined set end point Pe (set posture Ve), and a power consumption by movement (evaluation value data) on the path data are associated with each other to be created as one learning data set. Then, a large number of such learning data sets are created from a variety of combinations of the set start point Ps and the set end point Pe (set posture Ve), and are stored into the database 34.

In the learning phase of the track planning module 32 in the example of the second embodiment, learning is performed by, for example, back propagation processing. The back propagation processing is based on the evaluation value data, and is performed through use of training data having a combination including the set start point Ps and the start posture Vs and the set endpoint Pe and the set posture Ve as input data, and the start point-side terminal point $P_1$ and the start point-side posture $V_1$ and each via point for connection (not shown in FIG. 10) and the end point-side terminal point $P_n$ and the end point-side posture $V_n$ of the partial path T2 as output data. Also in this case, so-called online learning may be applied.

Also in the second embodiment, as the machine learning algorithm of the track planning module 32, in addition to the deep learning illustrated herein, another machine learning algorithm (not particularly shown) using, for example, a support-vector machine or a Bayesian network may also be applied. Also in this case, the basic configuration, in which the partial path T2 that appropriately corresponds to the input set start point Ps and the input set end point Pe are output, is the same.

<Effects of Second Embodiment>

As described above, the robot system 1 according to the second embodiment includes the track planning module 32 configured to generate, based on content learned in the machine learning process, a partial path T2 along which the movement reference position is to pass such that the predetermined evaluation criterion becomes optimal. As a result, a more appropriate path T1 can be generated through use of a partial path 12 that is learned as having an appropriate evaluation criterion.

Further, in the second embodiment in particular, the track planning module 32 is configured to generate the path T1 by connecting the partial path T2 generated by the track planning module 32 from the set start point Ps to the set end point Pe. As a result, the path T1 can be efficiently generated by connecting the partial path T2.

Further, also in the second embodiment, the SBL or the RRT, which is a known method, may be used as a basic method for the path planning. In this case, as illustrated in FIG. 7, branching and searching of a via point is performed also from the set end point Pe, and a partial path T2 generated by the track planning module 32 based on the current via point on each of the set start point Ps side and the set end point Pe side may be used instead for random sampling by the SBL or the RRT.

<Hardware Configuration Example of Robot Controller>

Figure 12:
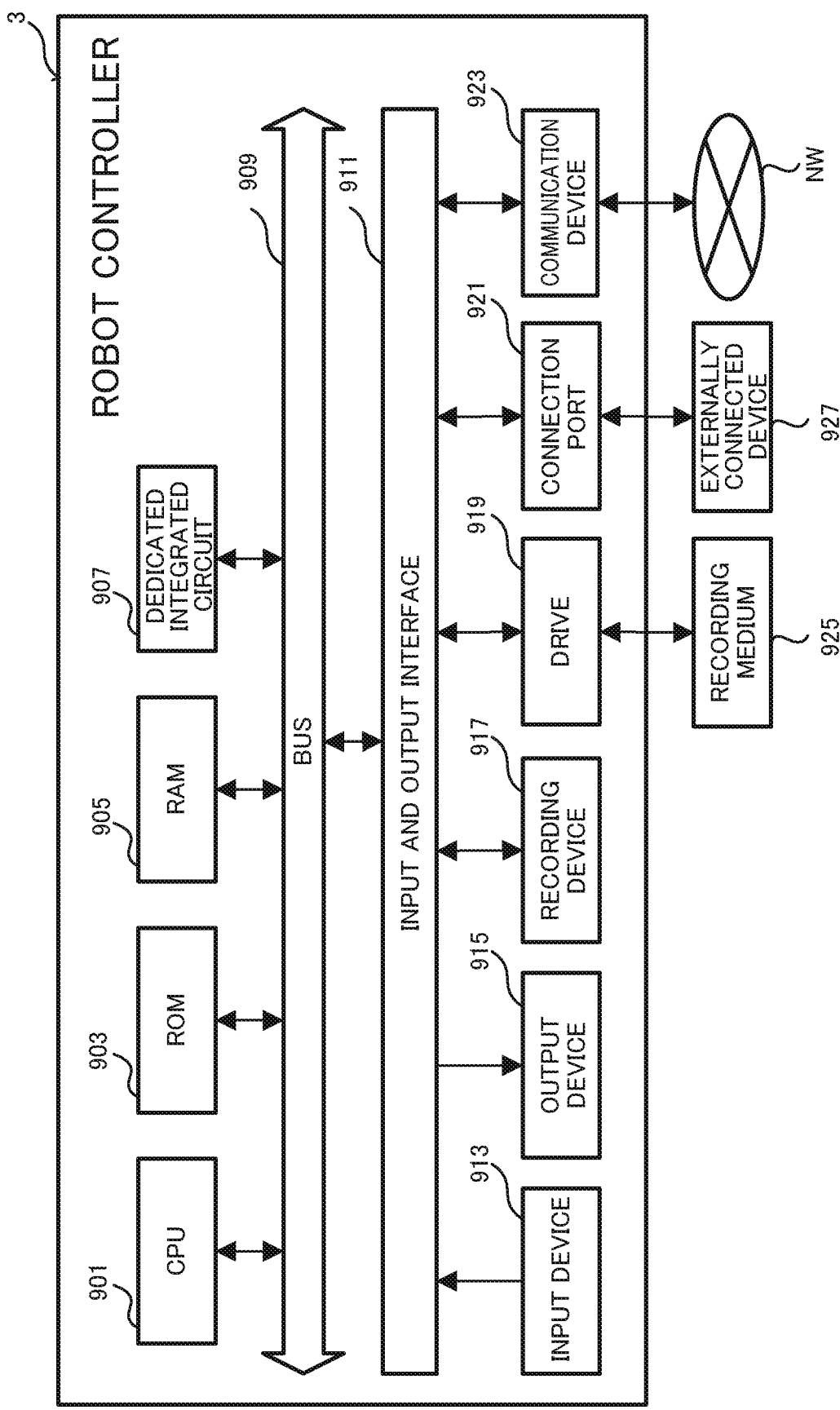
FIG. 12 is a system block diagram for illustrating a hardware configuration of a robot controller.

Next, referring to FIG. 12, a description is given of a hardware configuration example of the robot controller 3 for implementing processing by, for example, the work planning module 31, the track planning module 32, and the inverse kinematics calculation module 33, which are implemented as software by programs executed by the CPU 901 described above.

As illustrated in FIG. 12, the robot controller 3 includes, for example, the CPU 901, a ROM 903, a RAM 905, a dedicated integrated circuit 907, such as an ASIC or an FPGA, which is built for a specific use, an input device 913, an output device 915, a recording device 917, a drive 919, a connection port 921, and a communication device 923. Those components are connected to one another via a bus 909 and an input and output interface 911 in a manner allows signals to be mutually sent.

The programs can be recorded on, for example, the ROM 903, the RAM 905, or the recording device 917.

Further, the programs may also be recorded temporarily or permanently on a removable recording medium 925, for example. The removable recording medium 925 is a magnetic disk, for example, a flexible disk, an optical disc, for example, various types of CDs or MO discs and DVDs, or a semiconductor memory. Such a recording medium 925 can also be provided as so-called packaged software. In this case, the programs recorded on the recording medium 925 may be read out by the drive 919 to be recorded onto the recording device 917 via the input and output interface 911 and the bus 909, for example.

Further, the programs may also be recorded on, for example, a website for downloading the programs, another computer, or another recording device (not shown). In this case, the programs are transferred via a network NW, such as a LAN or the Internet, and the communication device 923 receives the programs. Then, the programs received by the communication device 923 may be recorded onto the recording device 917 via the input and output interface 911 and the bus 909, for example.

Further, the programs may also be recorded on, for example, an appropriate externally connected device 927. In this case, the programs may be transferred via an appropriate data connection port 921 to be recorded onto the recording device 917 via the input and output interface 911 and the bus 909, for example.

Then, the CPU 901 executes various types of processing in accordance with the programs recorded on the recording device 917, to thereby implement the processing by, for example, the work planning module 31, the track planning module 32, and the inverse kinematics calculation module 33. At this time, for example, the CPU 901 may read out the programs directly from the recording device 917 to execute the programs, or may temporarily load the programs onto the RAM 905 to execute the programs. Further, for example, when the CPU 901 receives the programs via the communication device 923, the drive 919, or the connection port 921, the CPU 901 may directly execute the received programs without recording the programs onto the recording device 917.

Further, as required, the CPU 901 may perform various types of processing based on a signal or information input from the input device 913, such as a mouse, a keyboard, or a microphone (not shown).

Then, the CPU 901 may output a result obtained by executing the processing described above from the output device 915, such as a display device or an audio output device. Further, as required, the CPU 901 may transmit the processing result via the communication device 923 or the connection port 921, or may record the processing result onto the recording device 917 or the recording medium 925.

Other Modification Example

Figure 13:
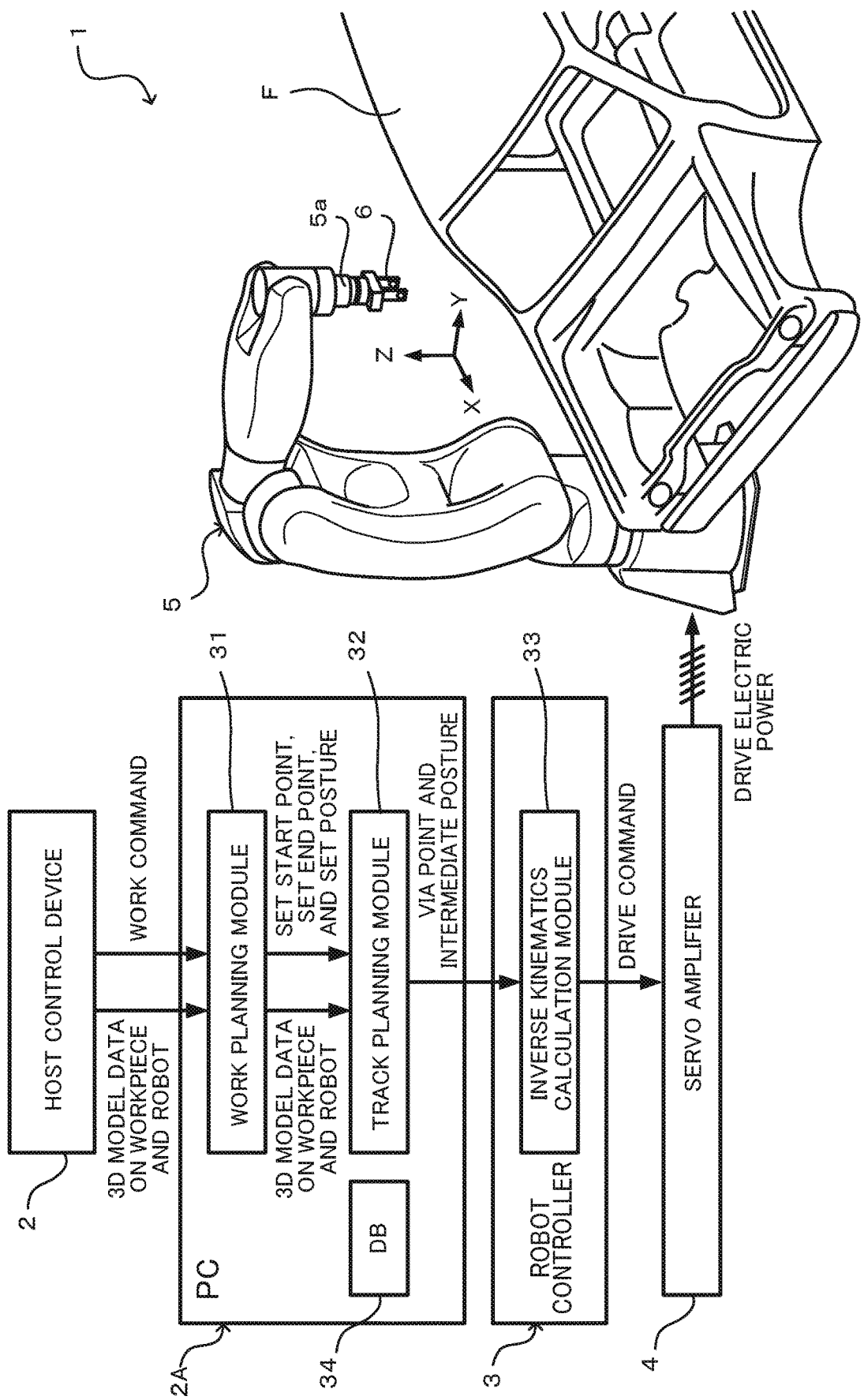
FIG. 13 is a diagram for illustrating an example of a system block configuration in a case where a work planning module, the track planning module, and a database are implemented on a general-purpose personal computer.

In each embodiment and each modification example described above, all of the work planning module 31, the track planning module 32, the inverse kinematics calculation module 33, and the database 34 are included in the robot controller 3 together, but the configuration is not limited thereto. As another configuration, as illustrated in FIG. 13, the robot controller 3 may include only the inverse kinematics calculation module 33, and the work planning module 31, the track planning module 32, and the database 34 may be implemented as software on a general-purpose personal computer 2A (abbreviated as "PC" in FIG. 13). Also in this case, the relationship in term of transmission and reception of various types of information and commands is the same. Further, on the general-purpose personal computer 2A, the track planning module 32 performs machine learning through use of the learning data set stored in the database 34, to thereby be able to achieve effects equivalent to those of each embodiment described above. The general-purpose personal computer 2A in this case corresponds to the robot path generation device in each of the claims.

When terms such as "vertical", "parallel", and "plane" are used in the above description, those terms are not used in the exact meanings thereof. Specifically, those terms "vertical", "parallel", and "plane" allow tolerances and errors in design and production, and have meanings of "substantially vertical", "substantially parallel", and "substantially plane", respectively.

Further, when terms such as "same", "equal", and "different" in relation to a dimension, size, shape, position, and the like of the appearance are used in the above description, those terms are not used in the exact meaning thereof. Specifically, those terms "same", "equal", and "different" allow tolerances and errors in design and production, and have meanings of "substantially the same", "substantially equal", and "substantially different", respectively.

Further, other configurations than those already described above may be used by appropriately combining the methods described in the above-mentioned embodiment and respective modification examples. Besides, although not exemplified in detail, the embodiments and the modification examples can be embodied with various changes within the range not departing from the gist thereof. In other words, it should be understood by those skilled in the art that various modifications, combinations, sub-combinations and alterations may occur depending on design requirements and other factors insofar as they are within the scope of the appended claims or equivalents thereof.

The invention claimed is:

1. A robot system, comprising:
   a robot;
   a robot path generation device, comprising, circuitry configured to:
      hold a data set, in which a plurality of pieces of path data, generated based on a motion constraint condition of a robot, and evaluation value data, which corresponds to each of the plurality of pieces of path data and is a measure under a predetermined evaluation criterion, are associated with each other; and
      generate, based on a result of a machine learning process that is based on the data set, a path of the robot between a set start point and a set end point, which are freely set, the path including a plurality of via points, and
   a robot controller configured to control a motion of the robot based on a result of generation obtained by the robot path generation device,
   wherein the predetermined evaluation criterion includes at least one of an electric power consumption, a period of time of motion, a vibration evaluation value, or a load on a specified axis,
   wherein the circuitry is further configured to:
      generate, based on content learned in the machine learning process, the plurality of via points through which the path is to next pass, such that a value of the predetermined evaluation criterion is optimized; and
      generate the path by starting branching and searching at the plurality of via points from the set start point, and repeating the branching and searching until the path reaches a vicinity of the set end point, wherein a distance between the vicinity and the set end point is less than a predetermined distance;
   wherein the plurality of via points are selected based on content learned in the machine learning process.

2. The robot system according to claim 1, wherein the circuitry is further configured to generate, based on content learned in the machine learning process, a partial path along which the path is to pass such that the predetermined evaluation criterion becomes optimal.

3. The robot system according to claim 2, wherein the circuitry is further configured to generate the path by connecting the partial path generated from the set start point to the set end point.

4. The robot system according to claim 1, wherein the predetermined evaluation criterion includes a distance of a route of motion.

5. The robot system according to claim 1, wherein the motion constraint condition is set to an area of motion of the robot that satisfies at least one of:
- an area of motion in which the robot avoids interfering with or coming into contact with a work environment surrounding the robot;
- an area of motion in which the robot avoids entering a predetermined entry-prohibited area; or
- an area of motion in which the robot avoids inclining an object handled by the robot by a predetermined angle or more.

6. The robot system according to claim 1, further comprising an input device configured to receive setting of the motion constraint condition.

7. The robot system according to claim 1, further comprising a memory configured to store a new data set, in which the path of the robot is associated with the motion constraint condition of the robot and the evaluation value data.

8. The robot system according to claim 1, wherein the predetermined evaluation criterion is the electric power consumption.

9. The robot system according to claim 1, wherein the predetermined evaluation criterion is the period of time of motion.

10. The robot system according to claim 1, wherein the predetermined evaluation criterion is the vibration evaluation value.

11. The robot system according to claim 1, wherein the predetermined evaluation criterion is the load on a specified axis.

* * * * *